(12) United States Patent
Muegge

(10) Patent No.: US 11,624,490 B2
(45) Date of Patent: Apr. 11, 2023

(54) LIGHTING APPARATUS FOR VEHICLES

(71) Applicant: HELLA GmbH & Co. KGaA, Lippstadt (DE)

(72) Inventor: Martin Muegge, Geseke (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/231,818

(22) Filed: Apr. 15, 2021

(65) Prior Publication Data

US 2021/0231288 A1 Jul. 29, 2021

Related U.S. Application Data

(63) Continuation of application No. PCT/EP2019/077140, filed on Oct. 8, 2019.

(30) Foreign Application Priority Data

Oct. 15, 2018 (DE) ..................... 10 2018 125 438.5

(51) Int. Cl.
*F21S 43/20* (2018.01)
*F21S 43/237* (2018.01)
(Continued)

(52) U.S. Cl.
CPC ............... *F21S 43/26* (2018.01); *F21S 43/14* (2018.01); *F21S 43/237* (2018.01); *F21S 43/31* (2018.01); *G02B 5/0278* (2013.01)

(58) Field of Classification Search
CPC ............................. F21S 41/141; F21S 41/143
See application file for complete search history.

(56) References Cited

U.S. PATENT DOCUMENTS

| | | |
|---|---|---|
| 4,733,335 A | 3/1988 | Serizawa et al. |
| 5,490,049 A | 2/1996 | Montalan et al. |

(Continued)

FOREIGN PATENT DOCUMENTS

| | | |
|---|---|---|
| DE | 69415732 T2 | 6/1999 |
| DE | 102012213845 A1 | 2/2014 |

(Continued)

OTHER PUBLICATIONS

International Search Report dated Dec. 16, 2019 in corresponding application PCT/EP2019/077140.

*Primary Examiner* — Eric T Eide
(74) *Attorney, Agent, or Firm* — Muncy, Geissler, Olds & Lowe, P.C.

(57) ABSTRACT

A lighting apparatus for vehicles, having a light source and a headlamp lens assigned thereto. The headlamp lens has scattering optical elements for scattering the light. A light guide is disposed between the light source and the headlamp lens in such a way that, firstly, light emitted by the light source strikes an area of the headlamp lens delimited by an edge of the same or a portion of the headlamp lens and/or that, secondly, the plurality of light sources are disposed with different spatial orientations with respect to one another in terms of their principal axes such that the light emitted by the light sources strikes different portions of the headlamp lens, wherein the headlamp lens is disposed upstream and/or downstream of the light source in the principal emission direction for the purposes of scattering the light in a transmissive or reflective manner.

12 Claims, 2 Drawing Sheets

(51) Int. Cl.
*F21S 43/14* (2018.01)
*F21S 43/31* (2018.01)
*G02B 5/02* (2006.01)

(56) References Cited

U.S. PATENT DOCUMENTS

| | | | |
|---|---|---|---|
| 6,193,400 B1 * | 2/2001 | Schuster | B60Q 1/0041 |
| | | | 362/538 |
| 6,926,432 B2 | 8/2005 | Rodriguez Barros et al. | |
| 7,188,981 B2 | 3/2007 | Rodriguez Barros et al. | |
| 9,890,916 B2 | 2/2018 | Oh | |
| 9,982,862 B2 | 5/2018 | Stefanov et al. | |
| 10,293,742 B2 | 5/2019 | Fimeri et al. | |
| 10,761,243 B1 * | 9/2020 | Wei | G02B 3/005 |
| 11,137,128 B2 * | 10/2021 | Fleszewski | F21V 5/02 |
| 2012/0033441 A1 * | 2/2012 | Sousek | F21S 43/243 |
| | | | 362/555 |
| 2013/0021812 A1 * | 1/2013 | Schug | F21S 41/255 |
| | | | 362/487 |
| 2014/0056020 A1 | 2/2014 | Bungenstock et al. | |
| 2017/0327033 A1 | 11/2017 | Muegge et al. | |

FOREIGN PATENT DOCUMENTS

| | | |
|---|---|---|
| DE | 102012107644 A1 | 3/2014 |
| DE | 102014119326 A1 | 6/2016 |
| DE | 102015202595 A1 | 8/2016 |
| DE | 102015107644 A1 | 11/2016 |
| DE | 102015118302 A1 | 6/2017 |
| DE | 102016106760 A1 | 10/2017 |
| DE | 102016119326 A1 | 4/2018 |
| DE | 102017101593 A1 | 8/2018 |
| EP | 1304260 A1 | 4/2003 |
| EP | 2442013 A2 | 4/2012 |
| EP | 2671756 A2 | 12/2013 |
| WO | WO2012025363 A1 | 3/2012 |
| WO | WO2016067175 A1 | 5/2016 |

* cited by examiner

LIGHTING APPARATUS FOR VEHICLES

This nonprovisional application is a continuation of International Application No. PCT/EP2019/077140, which was filed on Oct. 8, 2019 and which claims priority to German Patent Application No. 10 2018 125 438.5, which was filed in Germany on Oct. 15, 2018 and which are both herein incorporated by reference.

BACKGROUND OF THE INVENTION

Field of the Invention

The present invention relates to a lighting apparatus for vehicles, comprising a light source and comprising a headlamp lens assigned to same, said headlamp lens comprising scattering optical elements for scattering the light.

Description of the Background Art

DE 10 2012 107 644 A1, which corresponds to US 2014/0056020, which is incorporated herein by reference, specifies a lighting apparatus for vehicles with a plurality of headlamp lenses, each of which is designed as an OLED light surface. These organic LED light sources are designed as surface-emitting LEDS and can have any size and contour. They enable a flat design and homogeneous light emission of the lighting apparatus. Due to the Lambertian, diffuse light distribution of the OLED light surfaces, the luminous intensity is not high enough to generate a brake light or direction indicator light function. They are therefore only used for tail light functions.

So that other signal light functions, in particular brake and direction indicator light functions, can also be generated homogeneously and in a space-saving manner, a lighting apparatus is known from DE 10 2015 118 302 A1 which has a plurality of light sources arranged in a matrix and an upstream lens for scattering the light. The lens can, for example, comprise diffractive optical elements. A disadvantage of the known lighting apparatus is that a relatively high number of light sources must be provided so that the lens has a homogeneous appearance.

DE 10 2017 101 593 A1 specifies a lighting apparatus for vehicles in which a light source is associated with a headlamp lens that has scattering elements of different shapes in different portions of said lens. This allows for the luminous surface to have a light line in one part and a homogeneously illuminated luminous surface in another part. A disadvantage of the known lighting apparatus is that when developing a relatively bright light source in the form of an LED matrix, due to the discrete luminous points caused by the scattering effect of the headlamp lens, a homogeneous appearance of the headlamp lens can only be achieved to a limited extent.

SUMMARY OF THE INVENTION

It is therefore an object of the present invention to provide a lighting apparatus for vehicles such that the light can be emitted from a headlamp lens in a relatively powerful manner while producing a homogeneous appearance.

To achieve this object, the invention is characterized in that a light guide is disposed between the light source and the headlamp lens in such a way that, firstly, light emitted by the light source strikes an area of the headlamp lens delimited by an edge of the same or a portion of the headlamp lens and/or that, secondly, the plurality of light sources are disposed with different spatial orientations with respect to one another in terms of their principal axes such that the light emitted by the light sources strikes different portions of the headlamp lens, wherein the headlamp lens is disposed upstream and/or downstream of the light source in the principal emission direction for the purposes of scattering the light in a transmissive or reflective manner.

According to the invention, the headlamp lens serves as a luminous surface which emits light with a relatively high luminous intensity. The surface-emitting LED formed in this way emits light homogeneously and relatively brightly, which can be used in particular for the signal light function of brake light and direction indicator light or daytime running light. The invention thus enables high-intensity and homogeneous illumination over a relatively large aperture angle range. The headlamp lens can be disposed upstream of the light source in the principal emission direction, wherein the light is scattered transmissively by means of the headlamp lens. The headlamp lens can be arranged downstream of the light source in the principal emission direction, wherein the light is scattered reflectively by means of the headlamp lens.

According to a further development of the invention, a lens or a microlens array containing a plurality of microlenses and/or a funnel-shaped light guide element are disposed as a light guide between the light source and the headlamp lens. Advantageously, this allows for light shaping which guides essentially the entire light emitted by the light source onto the surface of the headlamp lens. Thus, the light is selectively and uniformly focused on the luminous surface.

According to a further development of the invention, the light guide only has primary optics and a funnel-shaped light guide element. Both optical components simultaneously enable and limit the homogeneous shaping of light onto a rear side of the headlamp lens, which allows light to enter, or onto a reflective front side of said headlamp lens.

The light guide and/or the scattering optics are designed in such a way that the light is emitted from the headlamp lens in a horizontal aperture angle range of 150° to 170°, preferably in the range of 160° to 170°, and in a vertical aperture angle range of 20° to 60°, preferably of 40° to 50°. Advantageously, the headlamp lens has the function of a homogeneous light source surface, as is the case, for example, with OLED light sources.

According to a further development of the invention, the scattering optical elements are arranged on a rear side of the headlamp lens which faces the light source. The scattering optical elements are formed as microprism elements or as diffractive optical elements. Advantageously, the scattering optical elements are not visible to an observer from the outside, or appear to an observer as a diffuse surface.

According to a further development of the invention, a front side of the headlamp lens is designed to be free of optics or polished. Alternatively, the front side can also be provided with micro-optical elements or diffractive optical elements, so that the scattering can be further increased or a reflective optical surface, with a mirror coating, can be created.

According to a further development of the invention, the luminous surface has several portions, to each of which different light sources are assigned. The portions can have optics-free edges for delimitation, so that optical separation of light functions occurs.

According to a further development of the invention, the light source is designed as a semiconductor-based light source, in particular as an LED light source or laser light source, so that the luminous flux required for all signal functions can be provided at the luminous surface.

According to a further embodiment of the invention, the headlamp lens has a circumferential frame which prevents fastener(s) arranged at the edge of the headlamp lens for fastening the headlamp lens to a mount disposed in the housing of the lighting apparatus from being concealed.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

A lighting apparatus for vehicles is preferably used as a signal light for generating a brake light, direction indicator and daytime running light function. Alternatively, the lighting apparatus can also be used to generate a tail light function or the like.

Figure 1:
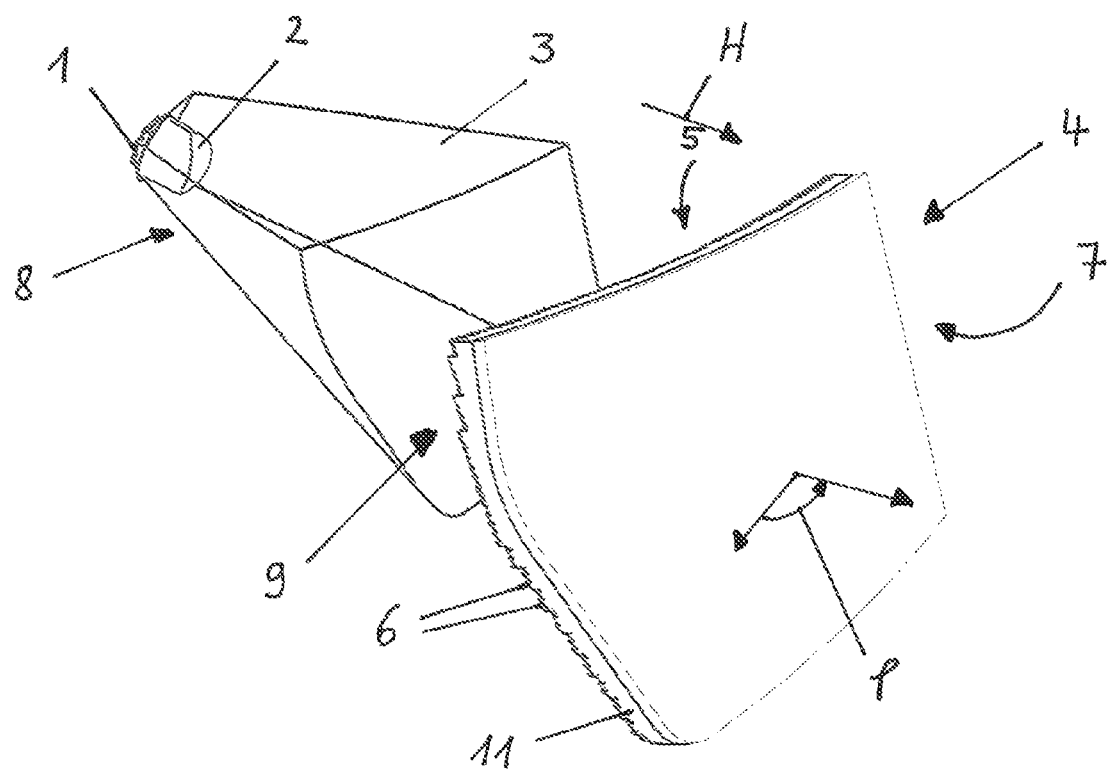
FIG. 1 is a perspective view of a lighting apparatus according to an exemplary embodiment.
Figure 2:
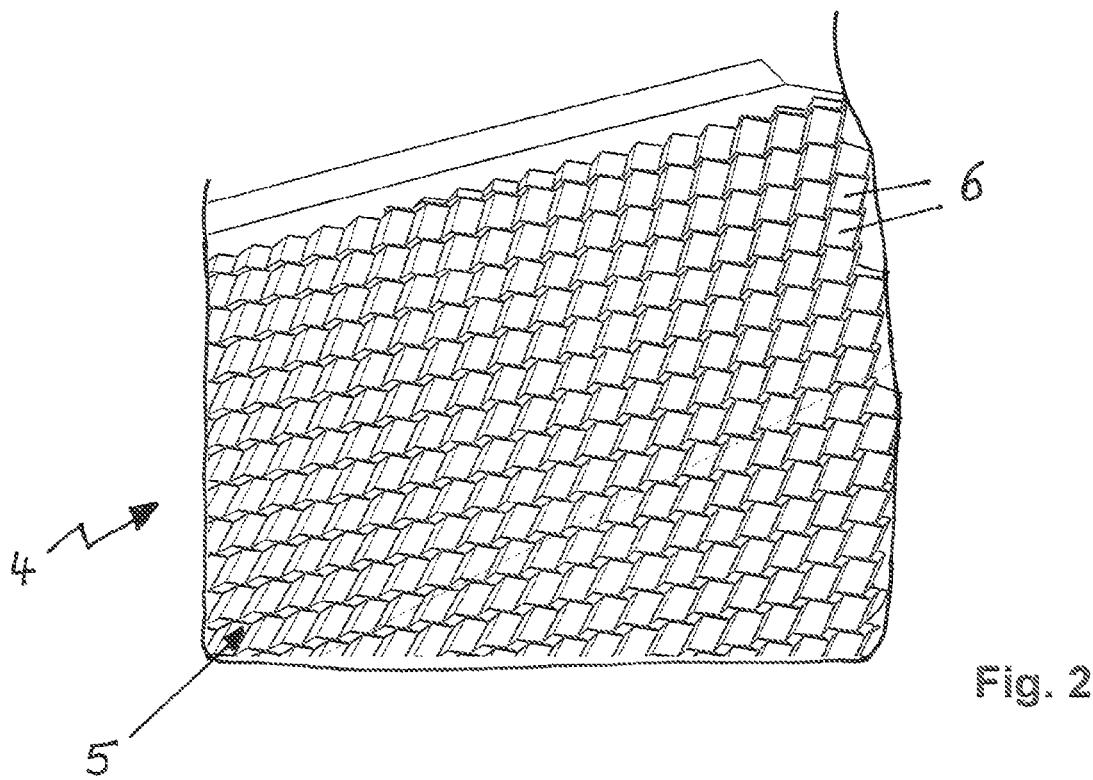
FIG. 2 is a partial rear view of a headlamp lens of the lighting apparatus according to FIG. 1.

According to a first embodiment of the lighting apparatus as shown in FIGS. 1 and 2, the lighting apparatus has a light source 1, primary optics 2 associated with the light source 1, a funnel-shaped light guide element 3 arranged downstream of the primary optics 2 in the principal emission direction H, and a headlamp lens 4 arranged downstream of the funnel-shaped light guide element 3 in the principal emission direction H. The headlamp lens 4 is made of a transparent material and in the present embodiment has a plurality of scattering optical elements 6 only on a rear side 5 facing the light source 1. A front side 7 of the headlamp lens 4 facing away from the light source 1 is free of optics and preferably polished. The scattering optical elements 6 are formed as micro-optical elements, preferably as prism optical elements. The scattering optical elements 6 are dimensioned in the μm range. Alternatively, the scattering optical elements 6 can also be designed as diffractive optics elements which are dimensioned in the μm range or the nm range.

According to an alternative embodiment of the invention not shown, the headlamp lens 4 may also have scattering optical elements on a front side, preferably in the same dimension and the same shape as scattering optical elements disposed on the rear side 5.

The funnel-shaped light guide element 3 has a light inlet side 8 facing the light source 1 with a smaller surface area than a light outlet side 9 facing the headlamp lens 4. An outer surface 10 of the funnel-shaped light guide element 3 is preferably formed from a light-transparent material and/or a light-absorbing material. The outer surface 10 of the funnel-shaped light guide element 3 thus serves as a masked or light-limiting surface. The contour of the light outlet side 9 of the funnel-shaped light guide element 3 essentially corresponds to the course of an edge 11 of the headlamp lens 4. The funnel-shaped light guide element 3 thus enables the light striking the front side of the headlamp lens 4 to be precisely limited to the size of the headlamp lens 4. According to an alternative embodiment of the invention not shown, the outer surface 10 of the funnel-shaped light guide element 3 can also be provided with a reflective layer on the inside.

The light emitted by the light source 1, which can be designed as an LED light source or laser light source, for example, is thus directed onto the surface of the headlamp lens 4 delimited by the edge 11. The scattering optical elements 6 of the headlamp lens 4 cause further homogenization of the light, so that a light beam 12 is emitted from the front side 7 of the headlamp lens 4 at a relatively large horizontal aperture angle φ in the range of 150° to 170°, preferably 160° to 170°, and at a vertical aperture angle in the range of 30° to 60°, preferably 40° to 50°.

According to an alternative embodiment of the invention not shown, instead of the funnel-shaped light guide element 3, a lens or a microlens array with a plurality of microlenses can be provided as a light guide between the light source 1 and the headlamp lens 4. These also cause light to be shaped or focused onto the front surface of the headlamp lens 4.

Figure 3:
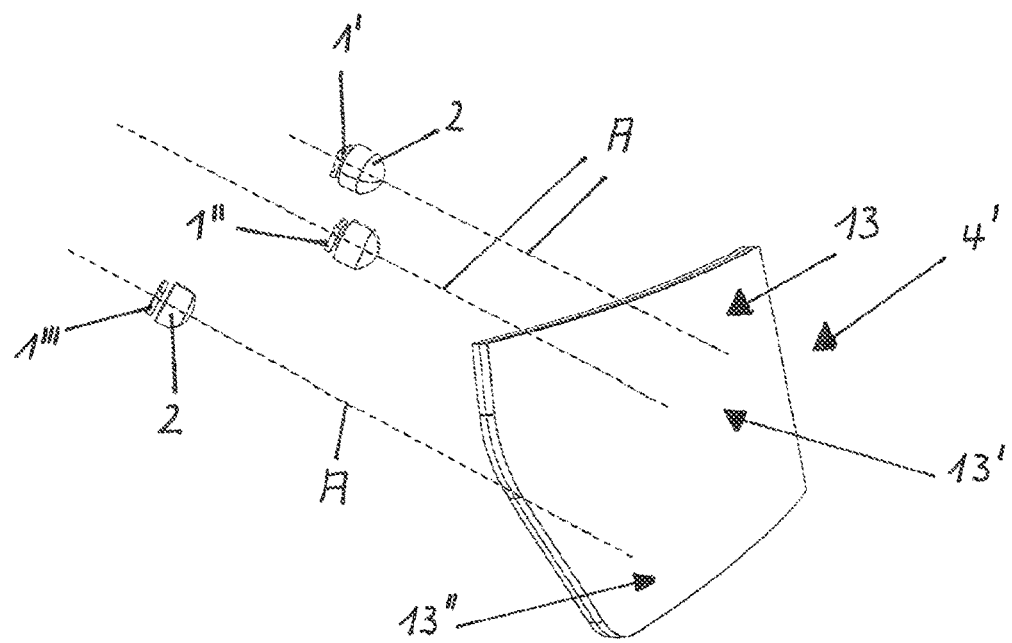
FIG. 3 is a perspective view of a lighting apparatus according to an exemplary embodiment.
Figure 4:
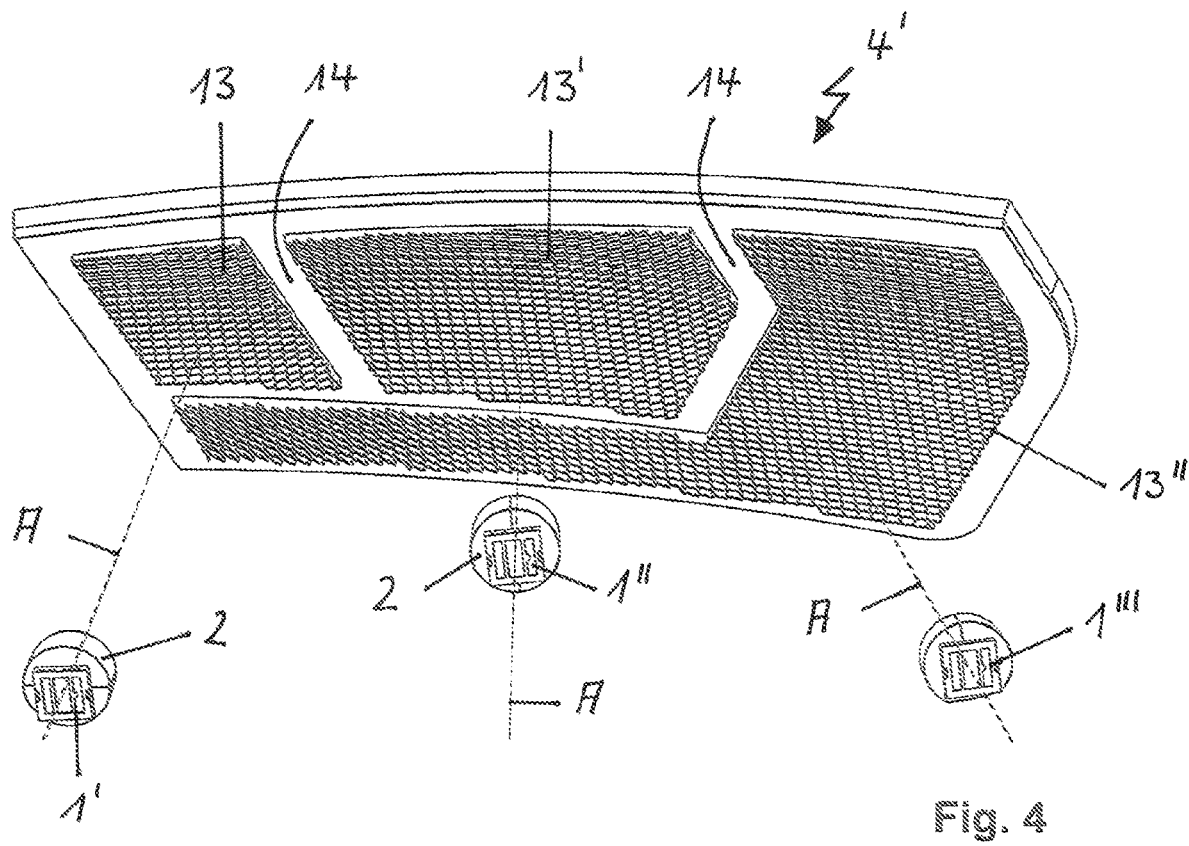
FIG. 4 is a rear view of the lighting apparatus according to FIG. 3.

According to a second embodiment of the invention as shown in FIGS. 3 and 4, several light sources 1 are associated with a single headlamp lens 4'. The light sources 1 are each directly followed by primary optics 2. The light sources 1 each have principal axes A which impinge on different portions 13, 13', 13" of the headlamp lens 4'. The plurality of light sources 1, in the present embodiment three light sources 1, are disposed in different planes and oriented in different directions. Due to the different spatial orientations of the light sources 1 in relation to the headlamp lens 4, light from a first light source 1' is directed onto a first portion 13, light from a second light source 1" is directed onto a second portion 13' and light from a third light source 1''' is directed onto a third portion 13" of the headlamp lens 4'.

The primary optics 2 of the respective light sources 1', 1", 1" [sic—1'''] is designed in such a way that light from the respective light sources 1', 1", 1" impinges on the respective fixed portion 13, 13', 13". An optics-free intermediate surface 14 is provided between the portions 13, 13', 13" of the headlamp lens 4', which separates the adjacent portions 13, 13', 13" from one another. The headlamp lens 4' has scattering optical elements 6 on a rear side 5 of the same, namely on the portions 13, 13', 13" which are preferably designed as prism optical elements.

The light sources 1, 1", 1''' can be designed as LED light sources or as laser light sources of the same light color or different light colors. For example, the first and second light sources 1, 1', 1" can be designed as LED light sources that emit light of red color for generating a tail light and/or brake light function. The third light source 1" can be designed as a light source emitting yellow light color to form a direction indicator function.

Alternatively, the LED light sources can also be of two-color design, for example a red-yellow LED light source, so that the entire surface of the headlamp lens 4" is available for the respective signal light functions. If necessary, the light sources can also be designed as RGB LED light sources that emit light in any color.

According to an alternative embodiment of the invention not shown, further a light guide—as described above—can also be provided between the light sources 1, 1", 1'" and the headlamp lens 4'. In particular, if the scattering optical elements 6 of the headlamp lens 4' are designed as prism elements, a separate funnel-shaped light guide element 3 is associated with each light source 1', 1", 1'".

Alternatively or additionally, the headlamp lens 4' may be arranged downstream of the light source 1', 1", 1'" in the principal emission direction H, wherein the light is reflected at a front side of the headlamp lens. The headlamp lens can be pot-shaped or plate-shaped, preferably in the form of a reflector.

The headlamp lens 4, 4' can be provided with a circumferential frame, which is not shown, by means of which fasteners, which are integrally formed on the headlamp lens 4, 4', can be concealed so that an observer cannot see the fasteners from the outside. The headlamp lens 4, 4' is fastened via at least one fastener to a mount arranged within a housing of the lighting apparatus. The housing of the lighting apparatus is closed in the usual manner by a light-transparent cover panel which is not shown.

According to an alternative embodiment of the invention not shown, the headlamp lens 4, 4' may form a cover panel which conceals the opening of the housing.

The described embodiments represent preferred embodiments of the present invention. It should be noted that the features described can be realized not only in the combinations of features described, but also alone or in other technically useful combinations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting apparatus for vehicles, the apparatus comprising:
   a light source; and
   a lens assigned to the light source, the lens comprising scattering optical elements to scatter light;
   wherein the light source includes a plurality of light sources that are disposed with different spatial orientations with respect to one another in terms of their principal axes such that the plurality of light sources are disposed in different planes and are oriented in different directions, so that the light emitted along the principal axis of each of the plurality of light sources strikes different portions of the lens from one another,
   wherein the lens is disposed upstream and/or downstream of the light source in a principal emission direction for the purposes of scattering the light in a transmissive or reflective manner, and
   wherein the different portions of the lens are each provided with the scattering optical elements and the different portions of the lens are separated from one another by optics-free intermediate surfaces, such that the light emitted along the principal axis of each of the plurality of light sources strikes the scattering optical elements that are provided in the different portions of the lens, respectively.

2. The lighting apparatus according to claim 1, wherein a light guide is disposed between the light source and the lens and wherein another lens or a microlens array containing a plurality of microlenses and/or a funnel-shaped light guide element are provided as the light guide.

3. The lighting apparatus according to claim 1, wherein a light guide is disposed between the light source and the lens and wherein primary optics and a funnel-shaped light guide element arranged downstream of the primary optics are provided as the light guide.

4. The lighting apparatus according to claim 1, wherein a light guide is disposed between the light source and the lens and wherein the light guide and/or the scattering optical elements are designed such that the light is emitted from the lens in a horizontal aperture angle range of 150° to 170° and a vertical aperture angle range of 30° to 60°.

5. The lighting apparatus according to claim 1, wherein the scattering optical elements are arranged on a rear side of the lens facing the light source, and wherein the scattering optical elements are designed as micro-optical elements or as diffractive optical elements.

6. The lighting apparatus according to claim 5, wherein a front side of the lens facing away from the light source is designed to be optics-free or is polished or is provided with the scattering optical elements.

7. The lighting apparatus according to claim 5, wherein the diffractive optical elements are dimensioned in a µm or nm range.

8. The lighting apparatus according to claim 1, wherein the light source is designed as a semiconductor-based light source.

9. The lighting apparatus according to claim 1, wherein the lens has a circumferential frame for concealing a fastener formed on the lens for fastening the lens to a mount on a housing of the lighting apparatus.

10. The lighting apparatus according to claim 1, wherein a light guide is disposed between the light source and the lens and wherein the light guide and/or the scattering optical elements are designed such that the light is emitted from the lens in a horizontal aperture angle range of 160° to 170°, and a vertical aperture angle range of 40° to 50°.

11. The lighting apparatus according to claim 8, wherein the semiconductor-based light source is an LED light source or a laser light source.

12. The lighting apparatus according to claim 1, wherein the scattering optical elements in each of the different portions of the lens have a same structure as one another.

* * * * *